United States Patent [19]

Sasaki

[11] Patent Number: 5,060,978

[45] Date of Patent: Oct. 29, 1991

[54] LIP FOR RAIL OF PASSIVE SEAT BELT SYSTEM AND PRODUCTION PROCESS THEREOF

[75] Inventor: Takanobu Sasaki, Yokohama, Japan

[73] Assignee: Nippon Seiko Kabushiki Kaisha, Tokyo, Japan

[21] Appl. No.: 470,245

[22] Filed: Jan. 25, 1990

[30] Foreign Application Priority Data

Jan. 26, 1989 [JP] Japan .................................. 1-16638

[51] Int. Cl.⁵ ............................................ B60R 21/10
[52] U.S. Cl. .................................... 280/804; 297/469
[58] Field of Search ............... 280/804, 801, 802, 807, 280/808; 297/469, 483; 191/47; 104/123, 139, 140

[56] References Cited

U.S. PATENT DOCUMENTS

| | | | |
|---|---|---|---|
| 4,296,944 | 10/1981 | Matsuoka et al. | 280/804 |
| 4,343,489 | 8/1982 | Suzuki | 280/804 |
| 4,498,690 | 2/1985 | Takada | 280/804 |
| 4,795,192 | 1/1989 | Kiyono | 280/804 |
| 4,834,426 | 5/1989 | Kiyono | 280/804 |

FOREIGN PATENT DOCUMENTS 191957 11/1986 Japan .

*Primary Examiner*—Kenneth R. Rice
*Attorney, Agent, or Firm*—Wegner, Cantor, Mueller & Player

[57] ABSTRACT

A lip suitable for use in covering a rail of a passive seat belt system is coated with an abrasion-resistant material at a slide surface. The lip can be produced coating the slide surface of the lip with the abrasion-resistant material while using an integral flange as a coating flow limiter. Preferably, the flange is a burr formed upon molding of the lip.

7 Claims, 3 Drawing Sheets

LIP FOR RAIL OF PASSIVE SEAT BELT SYSTEM AND PRODUCTION PROCESS THEREOF

BACKGROUND OF THE INVENTION a) Field of the Invention

The present invention relates to a rail suitable for use in covering as a dust cover a rail, along which a slider of a passive seat belt system is allowed to slide, to avoid exposure of an inner surface of the rail and also to a process for the production of the same.

b) Description of the Related Art

In a passive seat belt system, a slider is guided along a rail mounted on a roof-side of a vehicle. The rail defines a slot through which a slider extends, so that the interior of the rail is visible through the slot. To cover the slot of the rail, lips are usually provided.

Since the slider is caused to slide along the slot of the rail, the lip is made of a flexible material (e.g., rubber) so that the lip may be flexed upon passage of the slider.

Unpleasant noise and surface abrasion therefore occur when the slider slides on the lip.

SUMMARY OF THE INVENTION

With the foregoing in view, the present invention has as a primary object the provision of a lip free from the above-described problems of unpleasant noise and surface abrasion and a process for the production thereof without impairing the external appearance thereof.

In one aspect of the invention, there is thus provided a process for the production of a lip suitable for use in covering a rail of a passive seat belt system, said lip having a slide surface on which a slider is caused to slide and an outer surface which is visible even after the rail is mounted on a roof-side of a vehicle, which comprises coating the slide surface of the lip with an abrasion-resistant material while using an integral flange as a coating flow limiter.

In another aspect of the invention, there is also provided a lip for a passive seat belt system having a rail defining a slot along the length thereof and a slider movable along the rail and carrying an occupant-restraining webbing fastened thereto, said lip having a slide surface on which the slider is caused to slide and being suitable for use in covering the slot of the slider in such a way that the lip and another lip of the same kind are disposed with free edge portions thereof opposing each other at an interval narrower than the width of the slot, which comprises a coating of an abrasion-resistant material on the slide surface.

It is therefore possible to avoid unpleasant noise and surface abrasion owing to the coating of the abrasion-resistant material on the slide surface of the lip.

The provision of the integral flange as a coating flow limiter and its removal after the application of a coating formulation have made it possible to easily apply the abrasion-resistant material only to an inner surface of the lip, including the slide surface. It is therefore possible to completely prevent the abrasion-resistant material from dripping, flowing or otherwise depositing onto the outer surface of the lip (see FIG. 7).

It is preferred to form the integral flange along the boundary between the outer surface and the slide surface of the lip, because the outer surface can be easily kept uncoated without the need for any special masking or jig.

The process of the present invention has made it possible to shorten the time required for the coating of the slide surface and further to reduce the percent defective, leading to a reduction in the product cost.

BRIEF DESCRIPTION OF THE DRAWINGS

The above and other objects, features and advantages of the present invention will become apparent from the following description and the appended claims, taken in conjunction with the accompanying drawings in which:

DETAILED DESCRIPTION OF THE INVENTION AND PREFERRED EMBODIMENTS

Figure 1:
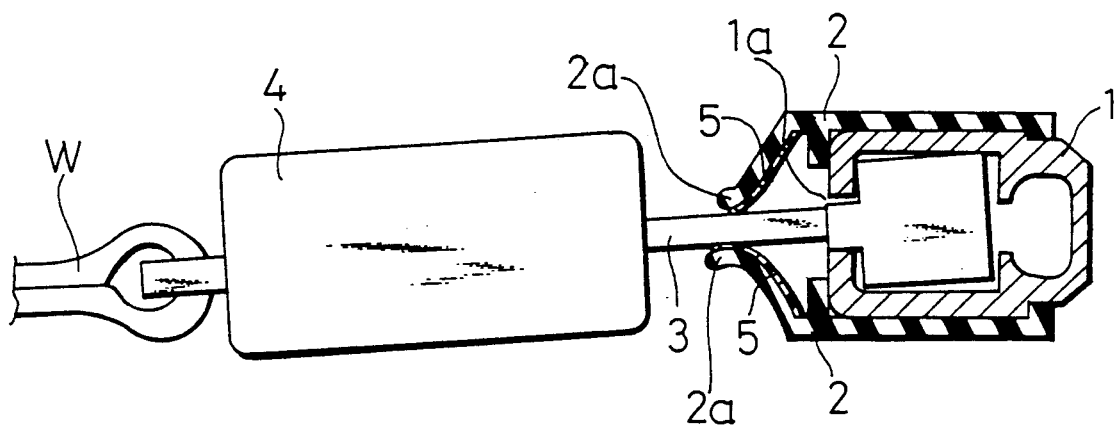
FIG. 1 is a fragmentary cross-sectional view of a passive seat belt system to which the present invention is applicable.

Referring first to FIG. 1, a slot $1a$ is formed in a rail 1 along which a slider 3 is caused to slide. The slider 3 supports a buckle 4 to which an occupant-restraining webbing W is fastened. A pair of lips 2,2 is provided as a dust cover over the slot $1a$.

The lips 2,2 are attached to the rail 1 with free edges $2a,2a$ thereof disposed closer to each other than their locations depicted in the drawing. The free edges $2a,2a$ are flexed to the locations shown in the drawing when the slider 3 passes by. A coating 5 of an abrasion-resistant material is applied on a part of each lip 2, which is located adjacent to the free edge $2a$ and to which the slider 3 is brought into sliding contact. This coated part may also be referred to as a "slide surface" herein.

Figure 2:
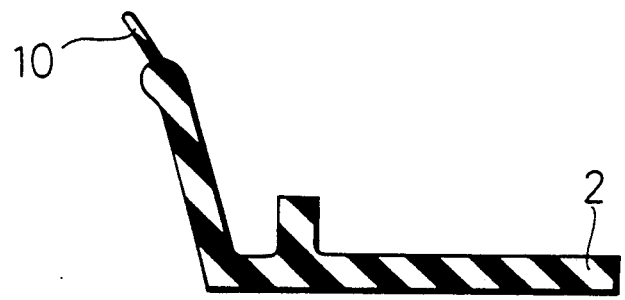
FIGS. 2 through 4 show one embodiment of the process of the present invention for the production of a FIGS. 5 and 6 illustrate another embodiment of the process of the present invention.
Figure 3:
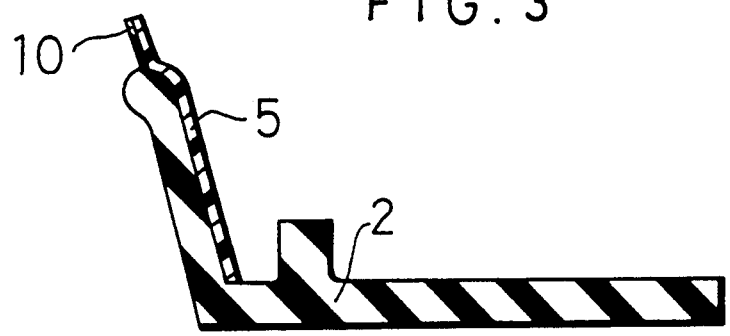
Figure 4:
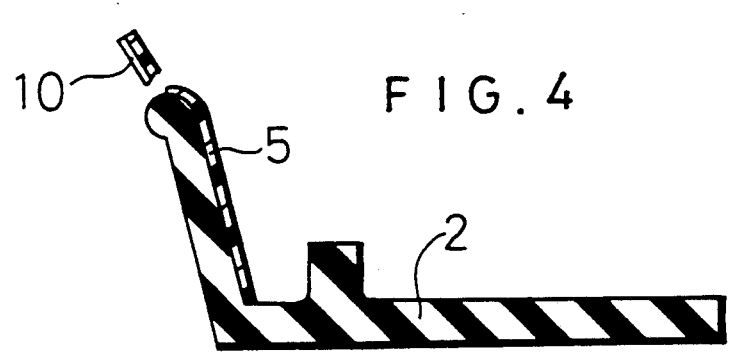

FIGS. 2 through 4 illustrates one embodiment of the process of the present invention for the production of the lip 2 provided with the coating 5 of the abrasion resistant material.

The lip 2 is made of a flexible material such as rubber. A burr 10 which has been formed upon molding of a lip stock remains as a coating flow limiter useful upon coating of the lip stock (see FIG. 2). A flange-like coating flow limiter may be formed in place of the burr upon molding of the lip stock.

With the burr 10 still remaining on the lip 2, the inner surface, namely, the slide surface of the lip 2 is coated with the abrasion-resistant material such as a urethane resin to apply the coating 5 on the slide surface (see FIG. 3). The coating can be applied by a suitable method known to date, such as spraying.

The burr 10 is then cut off to complete the production of the lip 2 (see FIG. 4).

Figure 5:
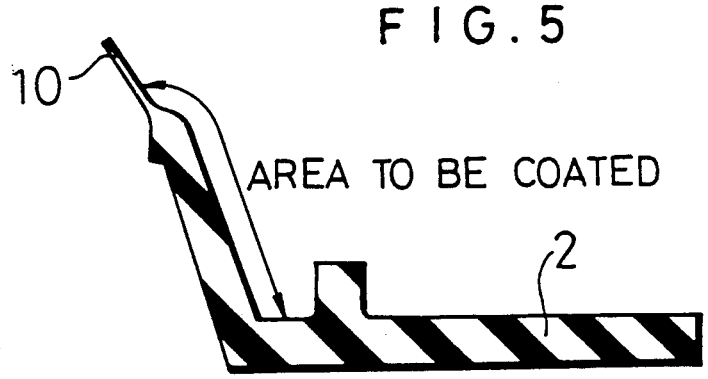
Figure 6:
Figure 7:
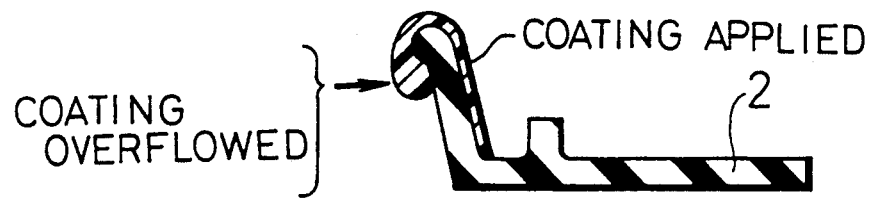
FIG. 7 is a referential drawing which is to be referred to upon description of advantageous effects of the present invention.

The burr 10 may be that formed along a parting line because of the use of a split mold. As an alternative, it may be a thin-walled flange formed intentionally as opposed to such a burr. This alternative embodiment is illustrated in FIGS. 5 and 6. Like the former embodiment, the flange is cut off after the coating.

I claim:

1. A process for the production of a lip suitable for use in covering a rail of a passive seat belt system, said lip having a slide surface on which a slider is caused to slide and an outer surface which is visible even after the rail is mounted on a roof-side of a vehicle, which comprises coating the slide surface of the lip with an abrasion-resistant material while using an integral flange as a coating flow limiter.

2. The process of claim 1, wherein the flange is a burr formed upon molding of the lip.

3. The process of claim 1, wherein the flange is formed along a boundary between the slide surface and the outer surface.

4. The process of claim 1, further comprising cutting off the flange subsequent to the coating.

5. A flexible lip for a passive seat belt system having a rail defining a slot along the length thereof and a slider movable along the rail and carrying an occupant-restraining webbing fastened thereto, said lip being adapted to be attached to the rail in such a way that the lip and another lip of the same kind are disposed on the rail with longitudinal free edge portions thereof opposing each other at an interval narrower than the thickness of a portion of the slider, said slider portion corresponding in position to the free edge portions of the lips, said flexible lip comprising:

a slide surface on which the slider is caused to slide;
removable edge defining means disposed along the length of the longitudinal free edge portion of the lip and formed integrally with the longitudinal free end portion for removably defining an edge of said slide surface; and
a coating of an abrasion-resistant material on the slide surface.

6. The flexible lip of claim 5, wherein the abrasion-resistant material is a urethane resin.

7. The flexible lip of claim 5, wherein said removable edge defining means is a flange.

* * * * *